US010389832B2

(12) United States Patent
Rombakh et al.

(10) Patent No.: US 10,389,832 B2
(45) Date of Patent: Aug. 20, 2019

(54) REMOTE CASTING OF MEDIA CONTENT

(71) Applicant: Wyse Technology L.L.C., Santa Clara, CA (US)

(72) Inventors: Oleg Rombakh, Los Gatos, CA (US); Richard Goldberg, Los Gatos, CA (US)

(73) Assignee: WYSE TECHNOLOGY L.L.C., Santa Clara, CA (US)

( * ) Notice: Subject to any disclaimer, the term of this patent is extended or adjusted under 35 U.S.C. 154(b) by 325 days.

(21) Appl. No.: 15/436,248

(22) Filed: Feb. 17, 2017

(65) Prior Publication Data

US 2018/0241609 A1 Aug. 23, 2018

(51) Int. Cl.

| | |
|---|---|
| ***G06F 15/16*** | (2006.01) |
| ***H04L 29/08*** | (2006.01) |
| ***G06F 3/14*** | (2006.01) |
| ***H04L 29/06*** | (2006.01) |

(52) U.S. Cl.

CPC ............ *H04L 67/28* (2013.01); *G06F 3/1454* (2013.01); *G06F 3/1462* (2013.01); *H04L 65/605* (2013.01); *G09G 2370/022* (2013.01)

(58) Field of Classification Search

CPC ................ G06F 3/1454; G06F 3/1462; G09G 2370/022; H04L 65/605; H04L 67/28

USPC ....... 709/202, 203, 204, 205, 217, 219, 226, 709/227

See application file for complete search history.

(56) References Cited

U.S. PATENT DOCUMENTS

2015/0199529 A1* 7/2015 Rosenberg ............ G06F 21/606 726/26
2015/0339274 A1* 11/2015 Pappu ................ H04N 21/4126 715/205
2016/0112523 A1* 4/2016 Bagasra ............ G06F 17/30861 709/217
2017/0019720 A1* 1/2017 Chawla ............. H04N 21/8133
2017/0142035 A1* 5/2017 Bradley .................. H04L 51/32
2017/0250882 A1* 8/2017 Kellicker ................ H04L 43/08
2018/0109851 A1* 4/2018 Finlayson ........ H04N 21/42684

* cited by examiner

*Primary Examiner* — Liang Che A Wang

(74) *Attorney, Agent, or Firm* — Kirton McConkie; Brian Tucker

(57) ABSTRACT

In a desktop virtualization environment, a server-side agent can be employed on the server to function as a cast device. Applications executing on a remote desktop will therefore see the agent as a cast device and can direct cast requests to the agent. When the agent receives a cast request, it can forward the cast request to a client-side proxy. The proxy can then transmit the cast request to an actual cast device that is part of the same subnet as the client. In this way, an application executing on the server will be able to seamlessly cast content to a cast device that is not part of the same subnet.

20 Claims, 8 Drawing Sheets

REMOTE CASTING OF MEDIA CONTENT

CROSS-REFERENCE TO RELATED APPLICATIONS

N/A

BACKGROUND

Casting is a technique for using one computing device to control what media content is displayed by another computing device. Commonly, a mobile phone is used to cast media content to a TV. The term “casting” is used generally to refer to two different techniques: (1) rendering content (or otherwise obtaining rendered content) on a computing device (e.g., a phone) and then outputting the rendered content for display on the other computing device (e.g., a cast-enabled TV or a TV to which a cast device has been connected); and (2) sending instructions to the other computing device for retrieving the content directly from the source.

FIGS. 1A and 1B generally illustrate these two techniques. In FIG. 1A, a client 101 is shown as sending rendered content to cast device 102. Client 101 can represent any type of computing device that is capable of casting to another device. For example, client 101 can represent a smart phone, a laptop or desktop computer, etc. Cast device 102 would typically represent a TV to which a cast device (e.g., a Chromecast device) has been connected. However, many TVs are currently being manufactured with built-in casting capabilities. In either case, client 101 and cast device 102 can be connected to the same LAN (or more particularly, the same subnet) to allow the content rendered by client 101 to be transmitted to cast device 102 for display. This technique is oftentimes called screen mirroring since the rendered content sent to the cast device is typically the same as the rendered content that is displayed locally on the client. However, this technique may also be employed to output rendered content that will not be displayed locally. For example, Google provides a “Remote Display” API which allows game developers to output a game’s main display on a TV while simultaneously outputting an auxiliary display on the local device.

FIG. 1B illustrates the second general type of casting. In this case, client 101 sends an identification of content to retrieve, e.g., in the form of a URL, to cast device 102. Cast device 102 then retrieves the content directly from the content source 103 and renders it for display. Casting a YouTube video is a common example of this second type of casting. In addition to identifying the content to retrieve, client 101 can also provide playback controls while the content is being displayed. For example, client 101 may instruct cast device 102 to pause, skip forward, of terminate playback.

A key requirement of these casting techniques is that client 101 and cast device 102 must be part of the same subnet (or may possibly connect using Wi-Fi direct). This presents various difficulties in a desktop virtualization environment. In such environments, client 101 employs a remote display protocol to receive desktop display data for a remote desktop that is executing on a server (i.e., a computing device that is likely not part of the same subnet). In such a case, if it is desired to cast the remote desktop to cast device 102, the only option would be to render the remote desktop on client 101 and then use the first type of casting to transfer the rendered desktop to cast device 102. More specifically, client 101 would need a screen mirroring application that could capture the display buffer of client 101 and send it to cast device 102. The same would be true in published application scenarios (i.e., in scenarios where the display data for a single application rather than the entire desktop is sent to client 101).

The second type of casting would not be available because the server is not part of the same subnet as cast device 102. Therefore, cast device 102 would not be visible to the server. Because only the screen mirroring type of casting would be available in desktop virtualization environments, the casting experience will oftentimes be diminished for a number of reasons. For example, a significant amount of processing is required to decode the desktop display data, display it locally, and then transmit the display buffer contents to cast device 102. If client 101 is running on a battery (e.g., a laptop or smart phone), this processing can quickly drain it. Also, the remote display protocol oftentimes imposes limitations on the video quality such as by limiting the frame rate to 30 fps in a best case scenario. Furthermore, in practice, the frame rate at which desktop display data is transmitted via the remote display protocol is oftentimes much less due to network bandwidth or other limitations. In short, employing screen mirroring to cast a remote desktop to another display oftentimes results in a suboptimal experience.

BRIEF SUMMARY

The present invention extends to methods, systems, and computer program products for remotely casting media content. In a desktop virtualization environment, a server-side agent can be employed on the server to function as a cast device. Applications executing on a remote desktop will therefore see the agent as a cast device and can direct cast requests to the agent. When the agent receives a cast request, it can forward the cast request to a client-side proxy. The proxy can then transmit the cast request to an actual cast device that is part of the same subnet as the client. In this way, an application executing on the server will be able to seamlessly cast content to a cast device that is not part of the same subnet.

In one embodiment, the present invention is implemented as a method for remotely casting media content. A virtual cast device is loaded on a server with which a client has established a remote display protocol connection. The virtual cast device represents an actual cast device that is accessible to the client. The virtual cast device receives a cast request and transfers it over the remote display protocol connection to the client. The client then sends the cast request to the actual cast device.

In another embodiment, the present invention is implemented as computer storage media storing computer executable instructions which when executed implement a method for remotely casting media content. A remote display protocol connection is established between a client and a server. A cast device that is accessible to the client is discovered. Information about the cast device is transferred over the remote display protocol connection. A virtual cast device is loaded on the server to represent the cast device. The virtual cast device than receives a cast request and redirects the cast request over the remote display protocol connection to the client. The client sends the cast request to the cast device.

In another embodiment, the present invention is implemented as a method for remotely casting media content. A virtual cast device that executes on a server receives a cast request from an application that also executes on the server. The cast request is then transferred over a virtual channel of a remote display protocol connection to a cast sender that executes on a client. The cast sender sends the cast request to a cast device that is accessible to the client.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, the term "cast device" should be construed as any type of computing device that can be the target of a request to cast media content. A cast device may be a computing device that is separate from but connectable to a display device such as a TV, or a cast device may be incorporated into a display device. The term "cast request" should be construed as any type of request that targets a cast device. A cast request should be construed as including requests that include media content or that identify media content to retrieve for playback as well as requests for controlling the playback of the media content. The term "media content" should be construed as encompassing video only, audio only, or audio and video content.

The term "desktop virtualization environment" should be construed as encompassing each of the various types of environments in which a desktop or an application can be hosted on a server with its display output to a client using a remote display protocol. Therefore, desktop virtualization environments include the Windows Server Remote Desktop Services platform, the VMware Horizon platform, and the Citrix XenServer platform among many others. Accordingly, the term "remote display protocol" should be construed as encompassing any of the various protocols employed in these desktop virtualization environments (e.g., RDP, ICA, PCoIP, etc.).

Figure 2:
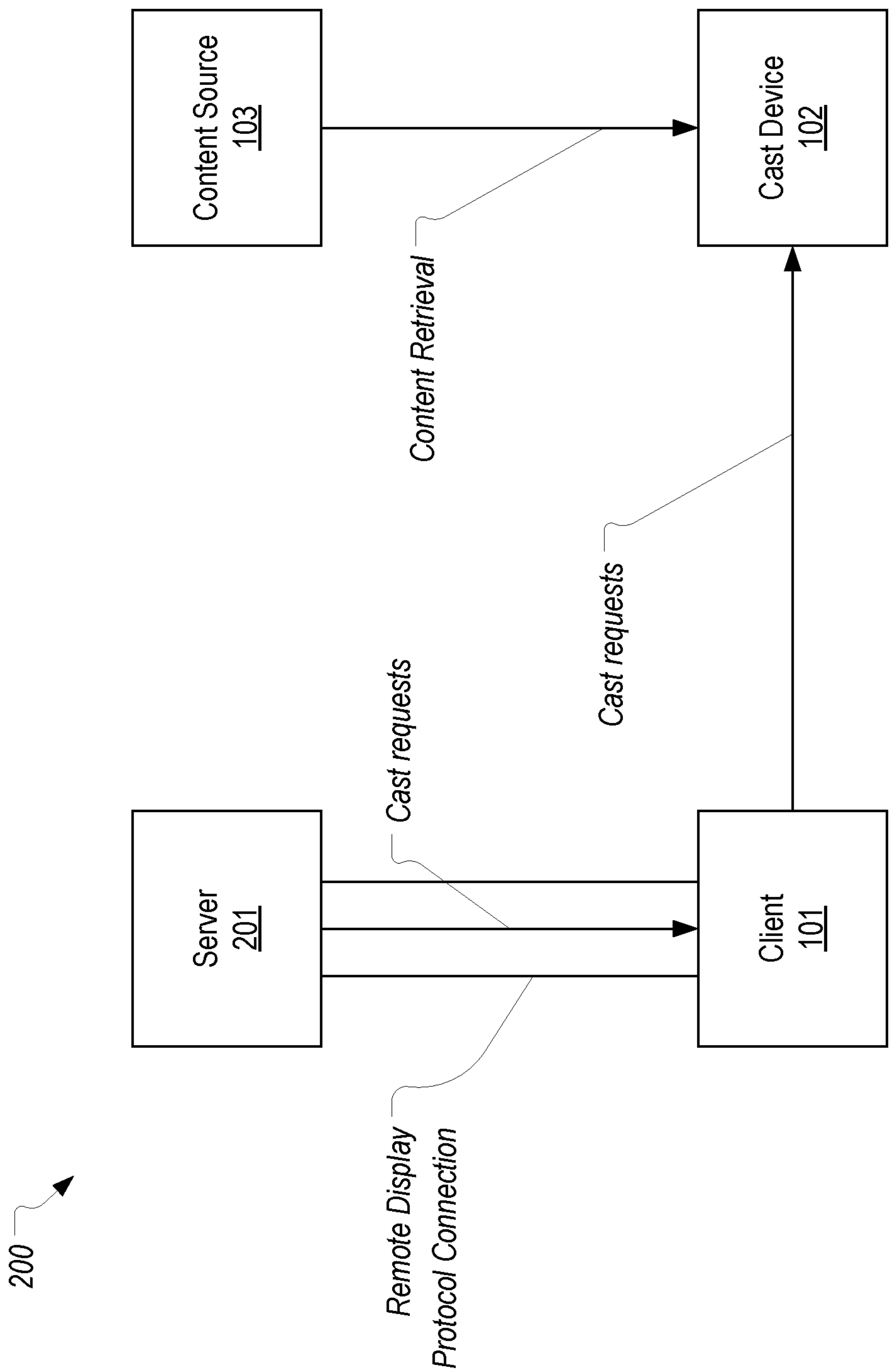
FIG. 2 illustrates an example desktop virtualization environment in which the present invention can be implemented.

FIG. 2 illustrates an example desktop virtualization environment 200 in which the present invention can be implemented and is intended to provide a general overview of how remote casting can be performed. Environment 200 includes client 101 and a server 201 with which client 101 communicates for the purpose of accessing a desktop or application executing on server 201. In particular, client 101 and server 201 can establish a remote display protocol connection which is used to transfer display data generated on server 201 to client 101 and to transfer I/O received at client 101 to server 201. Of relevance to the present invention, this remote display protocol connection can also be used to transfer casts requests from server 201 to client 101.

Figure 1A:
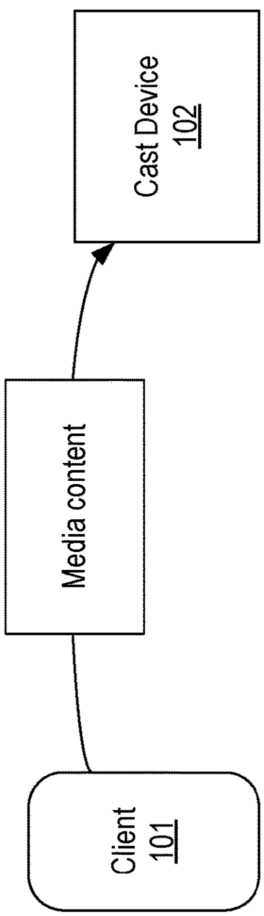
FIGS. 1A and 1B each illustrate a prior art casting technique.
Figure 1B:
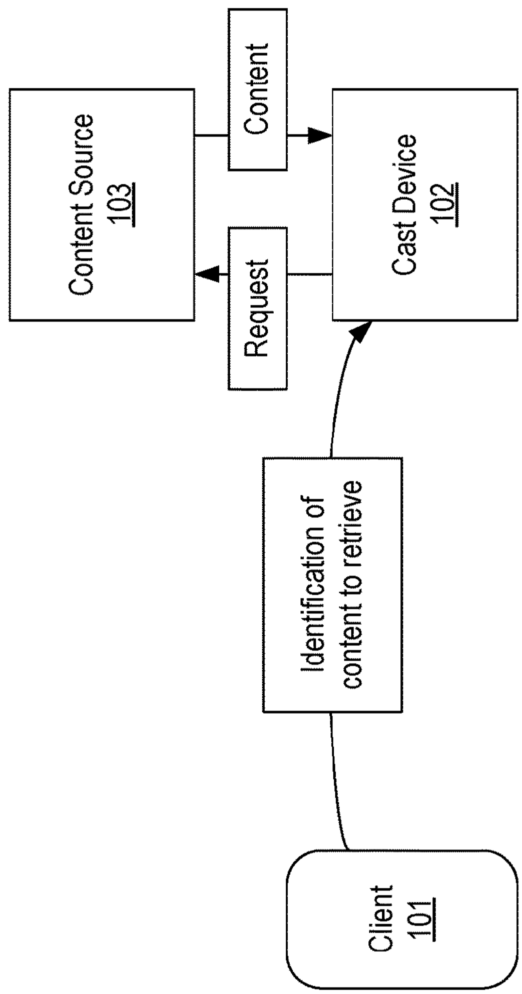

Environment 200 also includes a cast device 102 that is connected to the same subnet as client 101 (or connected via Wi-Fi direct to client 101) such that cast device 102 will be discoverable to applications on client 101. Cast requests that are received via the remote display protocol connection can be forwarded onto cast device 102 which can then process the cast requests in a standard manner such as by retrieving media content from content source 103. The communications between client 101, cast device 102, and content source 103 can occur in substantially the same way as described with reference to FIG. 1B. Also, client 101 could communicate with cast device 102 in substantially the same way as described with reference to FIG. 1A. In other words, cast device 102 could be a typical Chromecast, Apple TV, Amazon Fire TV, or any of the many other types of cast devices.

By way of overview, the present invention can allow an application that is executing on server 201 to cast media content to cast device 102 as if server 201 and cast device 102 were connected to the same subnet. Importantly, this can be accomplished in a manner that is transparent to the application and cast device 102. In other words, the application and cast device 102 can function in their normal manner.

Figure 3:
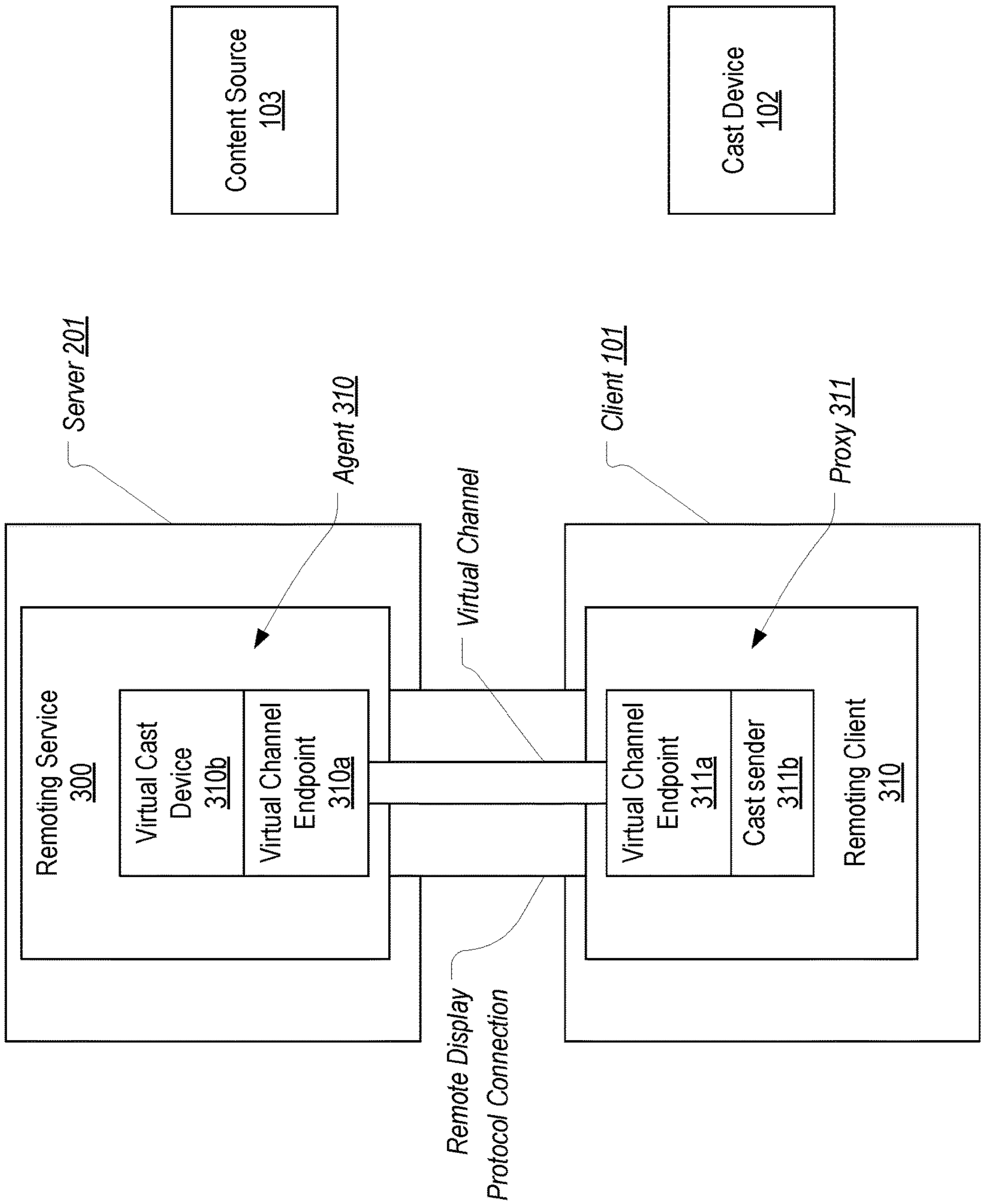
FIG. 3 illustrates a server-side agent and a client-side proxy that can be employed to implement the present invention.

FIG. 3 provides a more detailed illustration of the components that can be used on server 201 and client 101 to implement remote casting. As shown, server 201 can include a remoting service 300 which should be construed as the server-side components of a desktop virtualization environment. Similarly, client 101 is shown as including a remoting client 310 which should be construed as the client-side components of the desktop virtualization environment. Remoting client 310 can implement a remote display protocol with remoting service 300 to allow client 101 to access a desktop or application executing on server 201. As is known, server 201 can represent a physical or virtual machine.

In accordance with embodiments of the present invention, remoting service 300 includes an agent 310 while remoting client 310 includes a proxy 311. Proxy 311 can include a cast sender 311*b* that is configured to discover and communicate with cast devices that are connected to the same subnet as client 101 (or that are otherwise accessible to client 101). Agent 310 can be configured to load a virtual cast device 310*b* to represent a cast device that is available to client 101 (i.e., a cast device that is discoverable by cast sender 311*b*). Further, agent 310 and proxy 311 can each function as a virtual channel endpoint 310*a*/311*a* for purposes of communicating cast requests, cast responses, or other "cast communications" between server 201 and client 101.

Although not shown, server 201 can include a number of cast-enabled applications. The term "cast-enabled" implies that the applications are configured to communicate with a cast device. For example, if cast device 102 is a Chromecast, these applications could each implement a Google Cast sender application. The Chrome browser is one common example of a cast-enabled application.

FIGS. 4A-4D illustrate an example sequence of steps that represent the functionality performed by agent 310 and proxy 311 to implement remote casting. As mentioned above, in a desktop virtualization environment, it is likely that client 101 and server 201 will not be connected to the same subnet which implies that cast device 102 will also not be connected to the same subnet as server 201. As an example, a user of client 101 may be sitting in a conference room with a TV to which cast device 102 is attached and may have established a remote desktop connection with server 201 to access a remote desktop. In such a setting, the user may access a video on the remote desktop and desire to cast the video to the TV for others to see. With current casting techniques, however, even if the application provides an option to cast the video, it will not be possible to cast it to cast device 102 since cast device 102 will not be discoverable by any application on server 101. The present invention can address this type of situation among others.

Figure 4A:
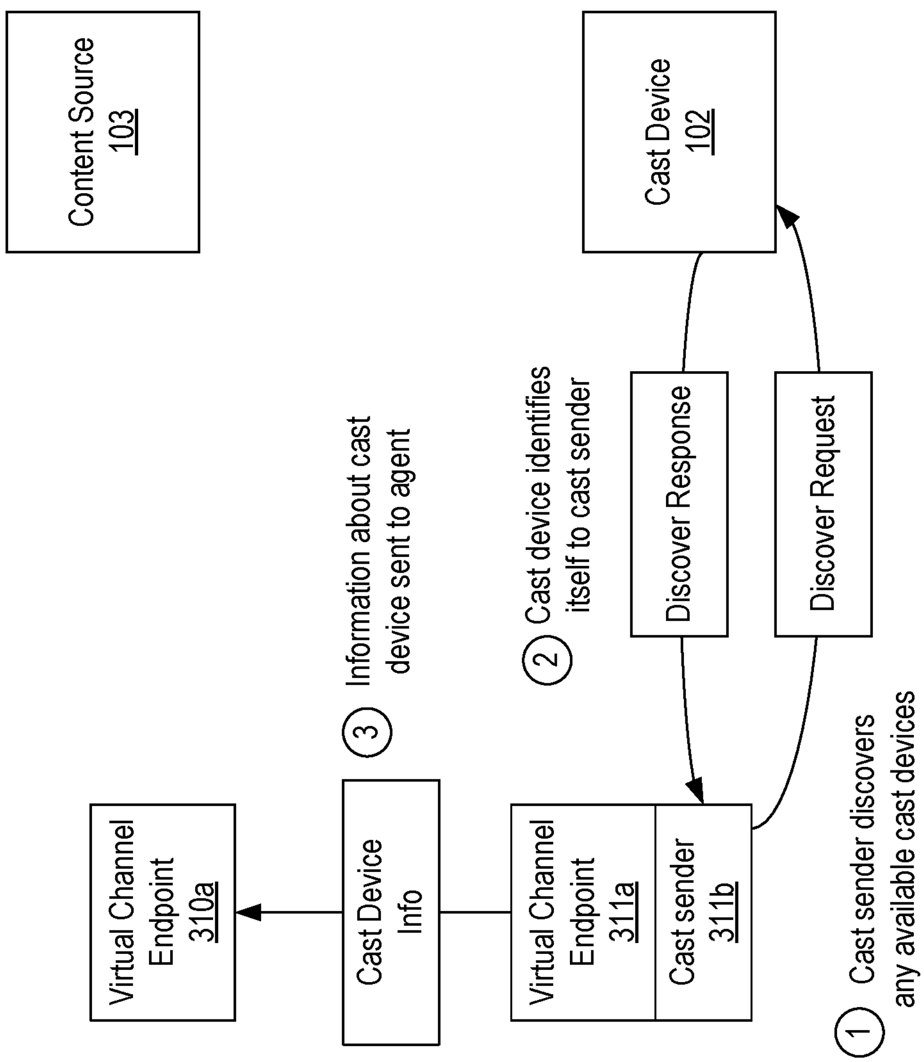
FIGS. 4A-4D illustrate an example of how remote casting can be performed.

Turning to FIG. 4A, it will be assumed that the user of client 101 has employed remoting client 310 to establish a remote display connection with server 201. As mentioned above, the remote display connection could either provide access to a full desktop or to a single application. In any case, in conjunction with establishing the remote display connection, proxy 311 can attempt to discover any cast devices that are accessible on the client 101's subnet. In particular, as represented in step 1, cast sender 311*b* can multicast a discover request over the subnet. As is known, cast devices can implement a protocol to allow themselves to be discovered. This protocol may be the simple service discovery protocol (SSDP) or any other network protocol that is suitable for discovering services available on a network. Although a single discover request is shown in FIG. 4A, it is possible that cast sender 311*b* could send more than one type of discover request such as may be the case when proxy 311 is configured to identify multiple types of cast devices that may employ different protocols for discovery.

Because cast device 102 is connected to the same subnet as client 101, it will receive the discover request and generate an appropriate discover response in step 2. As is known, this discover response can identify the type of service and the network location where the service is offered. Upon receiving the discover response, cast sender 311*b* can extract information about cast device 102 (e.g., its capabilities) from the response and provide the information to virtual channel endpoint 311*a* for transmission to virtual channel endpoint 310*a*. In this way, proxy 311 notifies agent 310 of any cast devices that are available to client 101.

Figure 4B:
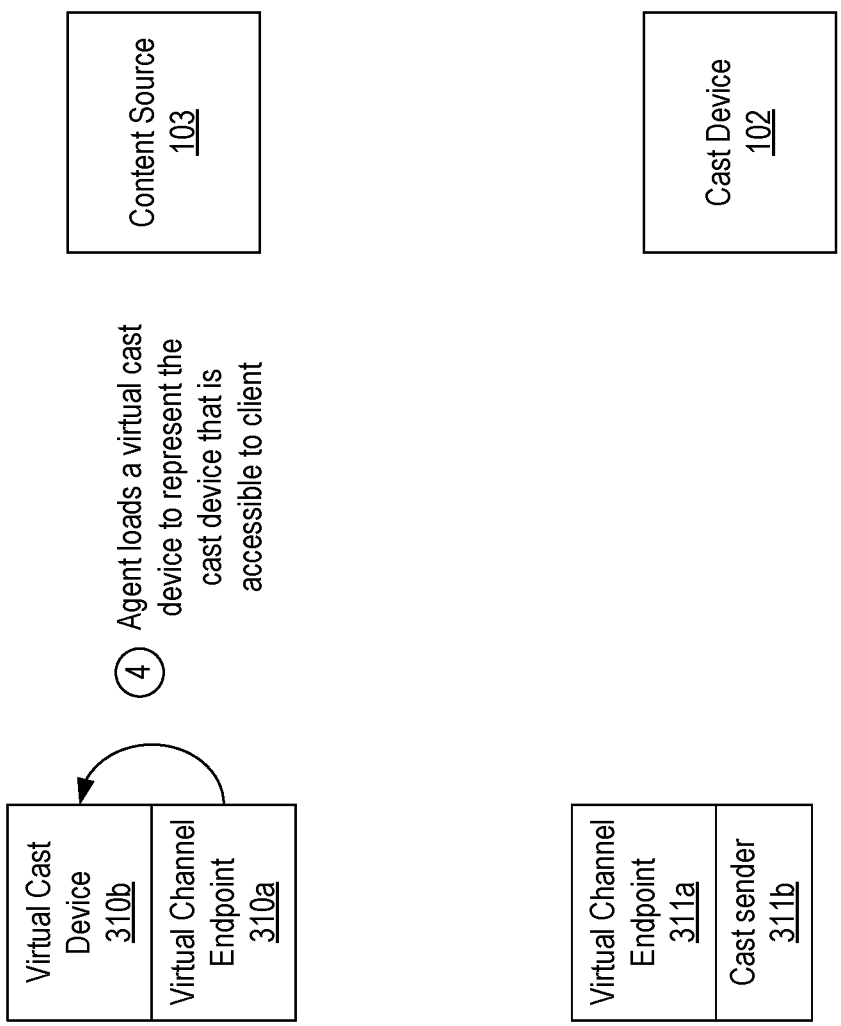

Turning to FIG. 4B, upon receiving the information about cast device 102 and as represented in step 4, virtual channel endpoint 310*a* can load a virtual cast device 310*b* to represent cast device 102. For example, if cast device 102 is a Chromecast, virtual channel endpoint 310*a* can configure virtual cast device 310*b* to appear as if it were a Chromecast. Alternatively, if cast device 102 is an Apple TV, virtual channel endpoint 310*a* can configure virtual cast device 310*b* as if it were an Apple TV. Importantly, virtual cast device 310*b* can be configured to monitor for discover requests that are multicast on server 201's subnet and to respond accordingly such that virtual cast device 310*b* will appear as an actual cast device to any cast-enabled applications on server 101.

Figure 4C:
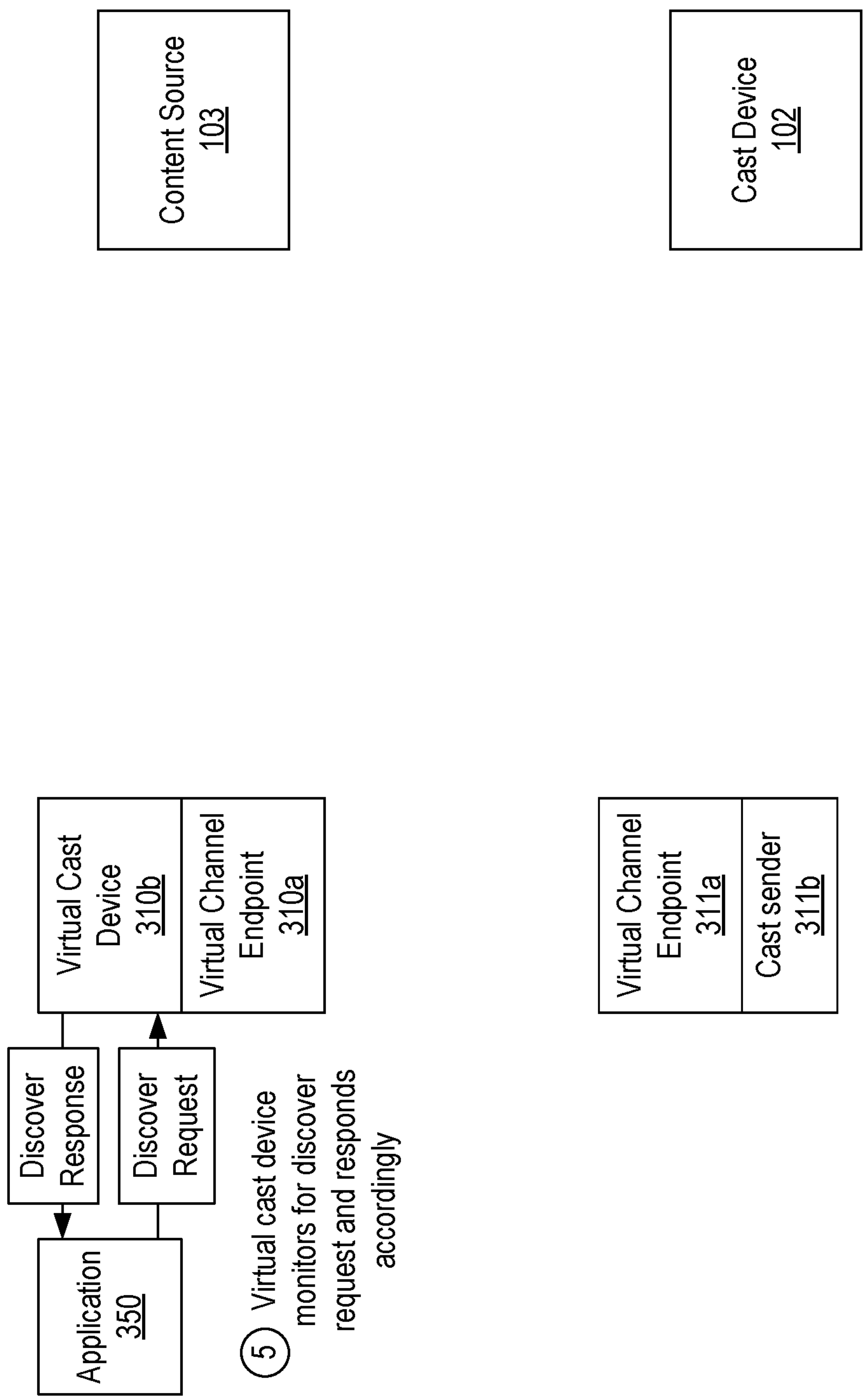
Figure 4D:
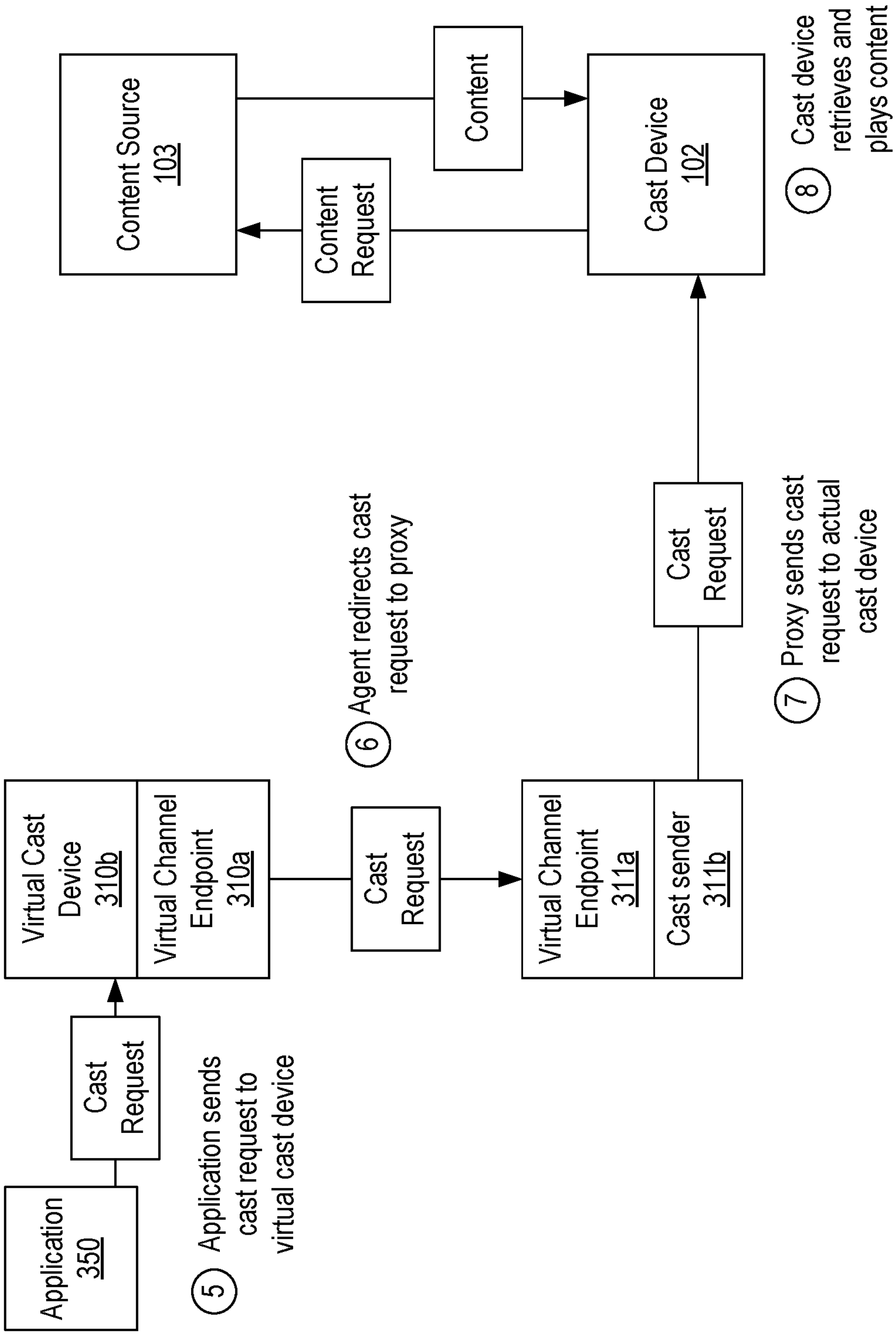

For example, in step 5 shown in FIG. 4C, application 350 (which is assumed to be an application executing on server 201 that is accessible to client 101) is shown as multicasting a discover request, and virtual cast device 310*b* is shown as providing a discover response back to application 350. This discover response can identify to application 350 that virtual cast device 310*b* is the same type of device and has the same capabilities as cast device 102. In essence, agent 310 will trick application 350 into believing that cast device 102 is connected to the same subnet.

In typical implementations, application 350 would send the discover request in response to a user selecting an option to cast content. For example, if application 350 is the Chrome browser, the discover request could be sent in response to the user selecting the cast icon that is displayed in the toolbar. In such a case, application 350 could then present to the user a list of the available cast devices which, in this example, would include virtual cast device 310*b*. The user could then select which cast device to cast content to.

Assuming that virtual cast device 310*b* is selected, application 350 can send a cast request to virtual cast device 310*b* in step 5. This cast request can be in whatever format is supported by cast device 102. In particular, because virtual cast device 310*b* will advertise itself as if it were cast device 102, application 350 will format cast requests targeting virtual cast device 310*b* in the format employed by cast device 102. If cast device 102 is a Chromecast, the cast request could be a message in JSON format. For example, application 350 could send a Load request that includes a MediaInformation data structure that defines a URL of the content to be played.

In response to receiving the cast request, virtual cast device 310*b* can route it to virtual channel endpoint 310*a* for delivery to virtual channel endpoint 311*a* in step 6. In other words, agent 310 can redirect any cast requests targeting virtual cast device 310*b* to proxy 311. Then, virtual channel endpoint 311*a* can provide the cast request to cast sender 311*b* which will in turn send the cast request to cast device 102 in step 7. For example, again assuming the cast request is a JSON formatted Load request, cast sender 311*b* can send the JSON formatted Load request over the subnet (or possibly via Wi-Fi direct) to cast device 102 as if the cast request has originated on client 101.

Finally, in step 8, cast device 102 will process the cast request in a standard manner. Assuming the cast request is a Load request, cast device 102 can extract the URL from the MediaInformation data structure and employ the URL to commence streaming the media content from content source 103. Although not shown, application 350 can issue any number of subsequent cast requests to control the playback of the content. For example, application 350 could issue a request to pause, stop, or resume playback or to change the volume. In each case, the cast request would be received at virtual cast device 310*b* and redirected to cast sender 311*b* for delivery to cast device 102. Also, although not shown, any cast responses sent by cast device 102 would be received at cast sender 311*b* and redirected back to virtual cast device 310*b* which would in turn send the cast response to application 350. As an example, cast device 102 may send a Media Status message to cast sender 311*b*.

Due to the processing performed by client 310 and proxy 311, both application 350 and cast device 102 will be completely unaware of the redirection that is occurring. From the perspective of application 350, casting will be performed in the same manner to virtual cast device 310*b* as it would if cast device 102 had been connected to the same subnet as server 101. Likewise, from the perspective of cast device 102, cast sender 311*b* will appear as if it were the actual source of the cast requests.

In some embodiments, agent 310 can configure virtual cast device 310*b* to selectively respond to discover requests. For example, virtual cast device 310*b* could be configured to only respond to discover requests that are received from applications executing on server 101 (e.g., by only responding to discover requests that originate from server 201's IP address). This will prevent applications on other devices that may be connected to the same subnet as server 201 from casting to cast device 102 (which may be a common scenario in desktop virtualization environments).

The above description provides an example where the second type of casting is implemented. It is noted, however, that the present invention can also be employed to perform the first type of casting (or screen mirroring). In such cases, the same process as represented in steps 1-7 can be performed with the difference being that the cast request will include the media content rather than a URL for retrieving the media content from content source 103. Although the quality of the media content may be diminished due to the limitations of the remote display protocol, the overall performance will be improved due to the fact that client 101 will not need to decode or display the content. Instead, the content will be contained in the cast request that proxy 311 will simply forward onto cast device 102.

Figure 5:
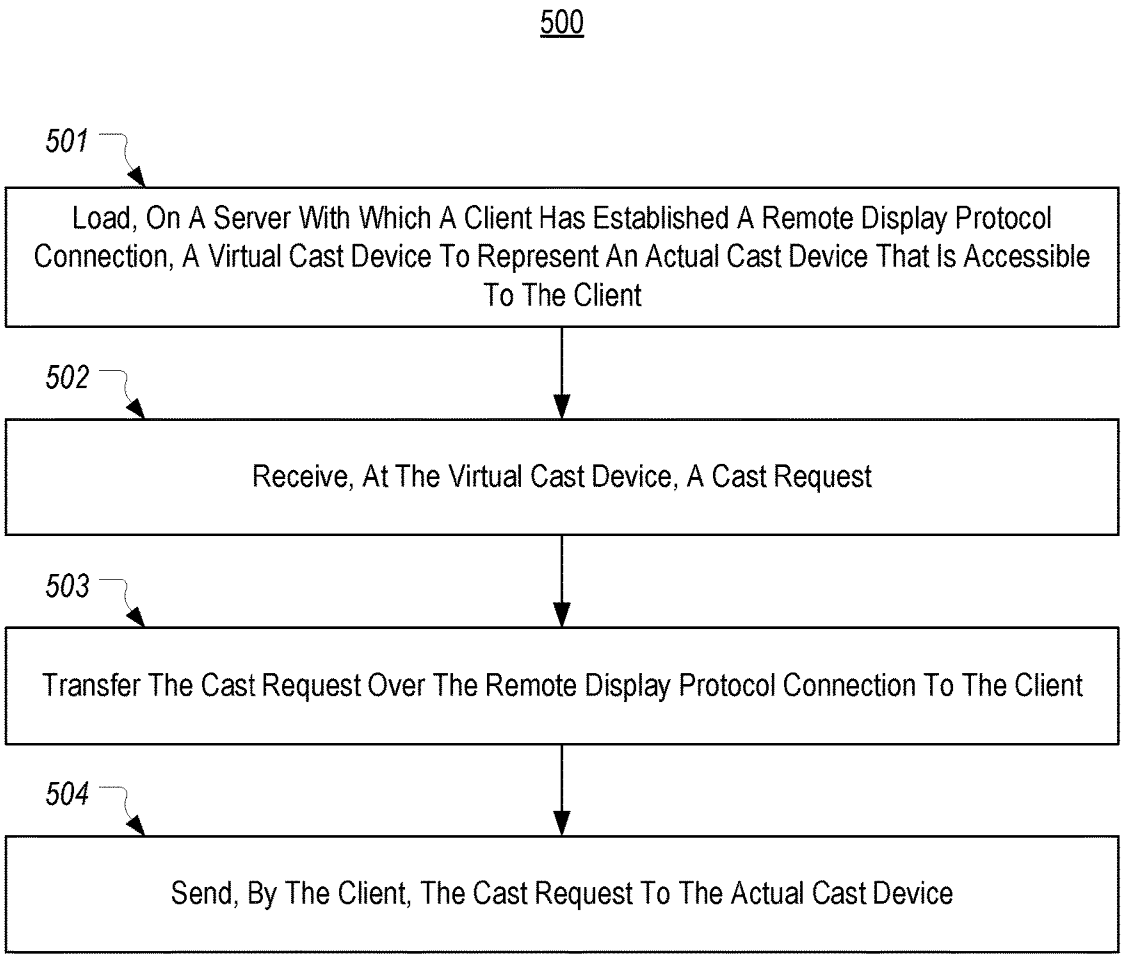
FIG. 5 provides a flowchart of an example method for remotely casting media content.

FIG. 5 provides a flowchart of an example method 500 for remotely casting media content. Method 500 can be implemented by agent 310 and proxy 311 in a desktop virtualization environment.

Method 500 includes an act 501 of loading, on a server with which a client has established a remote display protocol connection, a virtual cast device to represent an actual cast device that is accessible to the client. For example, agent 310 can load virtual cast device 310*b* to represent cast device 102.

Method 500 includes an act 502 of receiving, at the virtual cast device, a cast request. For example, virtual cast device 310*b* can receive a cast request.

Method 500 includes an act 503 of transferring the cast request over the remote display protocol connection to the client. For example, virtual channel endpoint 310*a* of agent 310 can transfer the cast request to virtual channel endpoint 311*a* of proxy 311.

Method 500 includes an act 504 of sending, by the client, the cast request to the actual cast device. For example, cast sender 311*b* can send the cast request to cast device 102.

In summary, the present invention provides a way for server-side applications to cast to a cast device that is accessible to a client but not to the server in a desktop virtualization environment. By implementing a virtual cast device on the server and a corresponding cast sender on the client, this redirection can be performed in a manner that is transparent to the server-side application and the cast device.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for remotely casting media content comprising:

loading, on a server with which a client has established a remote display protocol connection, a virtual cast device to represent an actual cast device that is accessible to the client;

receiving, at the virtual cast device, a cast request;

transferring the cast request over the remote display protocol connection to the client; and sending, by the client, the cast request to the actual cast device.

2. The method of claim 1, wherein loading the virtual cast device comprises configuring the virtual cast device to respond to discover requests over a subnet to which the server is connected.

3. The method of claim 1, wherein the cast request comprises a request to retrieve media content from a content source.

4. The method of claim 1, wherein the cast request includes media content.

5. The method of claim 1, wherein the cast request includes a command for controlling playback of media content at the actual cast device.

6. The method of claim 1, further comprising:

receiving, at the client, a response to the cast request;

transferring the response over the remote display protocol connection to the virtual cast device; and send, by the virtual cast device, the response to an application that issued the cast request.

7. The method of claim 1, wherein sending the cast request to the actual cast device comprises sending the cast request over a subnet to which the client is connected that is different than a subnet to which the server is connected.

8. The method of claim 1, wherein transferring the cast request over the remote display protocol connection to the client comprises transferring the cast request over a virtual channel.

9. The method of claim 1, wherein loading the virtual cast device comprises configuring the virtual cast device based on information about the actual cast device that is received from the client.

10. The method of claim 9, wherein the client obtains the information about the actual cast device by sending a discover request over a subnet to which the client is connected.

11. The method of claim 1, further comprising:
- loading, on the server, a second virtual cast device to represent a second actual cast device that is accessible to the client;
- receiving, at the second virtual cast device, a second cast request;
- transferring the second cast request over the remote display protocol connection to the client; and
- sending, by the client, the second cast request to the second actual cast device.

12. One or more computer storage media storing computer executable instructions which when executed implement a method for remotely casting media content, the method comprising:
- establishing a remote display protocol connection between a client and a server;
- discovering a cast device that is accessible to the client;
- transferring, over the remote display protocol connection, information about the cast device;
- loading a virtual cast device on the server to represent the cast device;
- receiving, at the virtual cast device, a cast request;
- redirecting the cast request over the remote display protocol connection to the client; and
- sending, by the client, the cast request to the cast device.

13. The computer storage media of claim 12, wherein discovering the cast device comprises sending a discover request over a subnet to which the client is connected.

14. The computer storage media of claim 12, wherein the method further comprises:
- receiving, at the virtual cast device, a discover request over a subnet to which the server is connected; and
- sending, by the virtual cast device, a discover response.

15. The computer storage media of claim 12, wherein the cast request comprises one of:
- an identification of media content to be retrieved from a content source;
- media content; or
- commands for controlling playback of media content.

16. The computer storage media of claim 12, wherein the method further comprises:
- receiving, by the client, a response to the cast request;
- redirecting the response over the remote display protocol connection to the virtual cast device; and
- sending the response to a server-side application that sent the cast request.

17. The computer storage media of claim 12, wherein the cast request is redirected via a virtual channel.

18. A method for remotely casting media content comprising:
- receiving, at a virtual cast device that executes on a server, a cast request from an application that also executes on the server;
- transferring the cast request over a virtual channel of a remote display protocol connection to a cast sender that executes on a client; and
- sending, by the cast sender, the cast request to a cast device that is accessible to the client.

19. The method of claim 18, further comprising:
- receiving, at the virtual cast device, a discover request that was sent by the application; and
- sending a discover response to the application.

20. The method of claim 18, further comprising:
- receiving, at the cast sender, a response to the cast request;
- transferring the response over the virtual channel to the virtual cast device; and
- sending the response to the application.

* * * * *